United States Patent [19]

Medvedev et al.

[11] Patent Number: 5,757,557
[45] Date of Patent: May 26, 1998

[54] BEAM-FORMING LENS WITH INTERNAL CAVITY THAT PREVENTS FRONT LOSSES

[75] Inventors: Vladimir Medvedev, El Segundo; William A. Parkyn, Jr., Lomita, both of Calif.

[73] Assignee: TIR Technologies, Inc., Hawthorne, Calif.

[21] Appl. No.: 872,002

[22] Filed: Jun. 9, 1997

[51] Int. Cl.⁶ .................................................. G02B 3/02
[52] U.S. Cl. .......................... 359/708; 359/711; 359/712; 359/869
[58] Field of Search ............................ 359/707, 708, 359/711, 712, 868, 869

[56] References Cited

U.S. PATENT DOCUMENTS

| | | |
|---|---|---|
| 4,770,514 | 9/1988 | Silverglate .......................... 359/708 |
| 5,235,470 | 8/1993 | Cheng ................................. 359/869 |
| 5,485,317 | 1/1996 | Perissinotto et al. ............... 359/712 |

*Primary Examiner*—Loha Ben
*Attorney, Agent, or Firm*—William W. Haefliger

[57] ABSTRACT

A device for directing light longitudinally forwardly, that comprises a lens body having a front face facing forwardly, rearward body extent, and a curved sidewall extending between the rearward body extent and the front face; a rear cavity in the body, the cavity having a sidewall and a front wall defining a corner; and a light source in the cavity, and characterized in that light rays transmitted by the light source toward the curved sidewall, and toward the corner are collimated forwardly.

14 Claims, 3 Drawing Sheets

5,757,557

BEAM-FORMING LENS WITH INTERNAL CAVITY THAT PREVENTS FRONT LOSSES

BACKGROUND OF THE INVENTION

Metallic and metal-coated reflectors are widely used to form illuminating beams from the light sources located at their foci. Their light-collecting efficiency, however, is limited by the inevitable loss of light directly out the front of the reflector. This loss can be alleviated only by making the reflector very deep—an impractical option.

SUMMARY OF THE INVENTION

It is a major object of the present invention to provide an improved beam-forming lens that overcomes deficiencies of reflectors, as referred to. Basically, the invention embodies a device for directing light longitudinally forwardly, in the combination comprising:

a) a lens body having a front face facing forwardly, rearward body extent, and a curved sidewall extending between the rearward body extent and the front face, b) a rear cavity in the body, the cavity having a sidewall and a front wall defining a corner, c) and a light source in the cavity, and characterized in that light rays transmitted by the light source toward the curved sidewall, and toward the corner are collimated forwardly.

It is another object of the invention to provide the lens front face with a portion that is offset toward the cavity and is in forward alignment with the cavity. As will be seen, the front face offset portion is typically forwardly convex, and the cavity is typically cylindrical.

It is another object to provide a cavity front wall that is forwardly concave, the sidewall then being forwardly tapered.

A further object of the invention in its preferred form is to provide a beam-forming lens of the same generally conical shape as conventional reflectors, but made of a transparent material, such as glass or plastic. The lens has cylindrical symmetry about an axis of rotation that forms the optical axis of its output beam. Its key feature is a generally cylindrical, internal cavity in which the light source is placed.

The sidewall of the cylindrical cavity refracts light away from the optical axis, while the end wall of the cylindrical cavity refracts light toward the optical axis. The source's light is thus separated into a sideways-going component and a forward-going component, with a sector of unused directions in between them. When the cylindrical cavity is properly shaped, this sector of unused directions is that which would be lost in a conventional reflector.

The sideways-going light strikes the curved, outer wall of the lens and is reflected forwardly toward the exit face, either by total internal reflection or by a metallic coating, depending upon the incidence angle of the light upon the outer wall. The forward-going light is collimated by either a bulge on the upper surface of the lens, or a combination of both. The top exit face of the lens may be planar, or slightly convex for moldability.

These and other objects and advantages of the invention, as well as the details of an illustrative embodiment, will be more fully understood from the following specification and drawings, in which:

DRAWING DESCRIPTION

The three figures, referred to below, show several variations of the invention, each with a conventional incandescent lamp. Any light source that radiates substantially in all directions is suitable.

FIG. 1 is a diagram showing a lens incorporating the invention, optimized solely by optical criteria;

FIG. 2 is a diagram showing another lens incorporating the invention, with a lens planar front face to facilitate production by a molding process; and FIG. 3 is a diagram showing another lens incorporating the invention, with a slightly convex front face, so that larger versions, when injection molded (as from transparent plastic), will not exhibit slumping of the planar front surface as the part shrinks while cooling.

DETAILED DESCRIPTION

Figure 1:
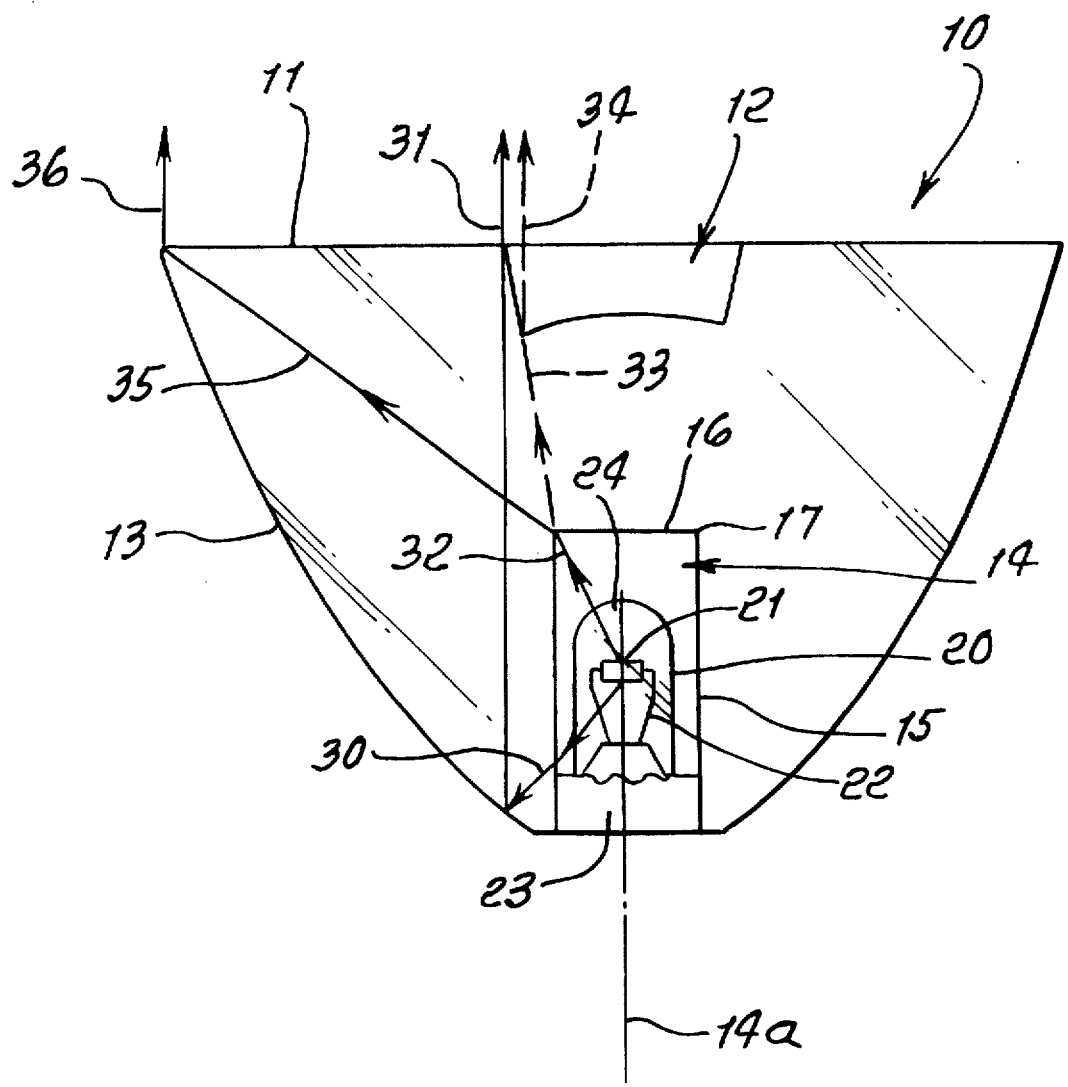

FIG. 1 shows lens body 10 with front face 11, recessed convex lens 12, forwardly divergently curved sidewall 13, rear cylindrical cavity 14, with sidewall 15, and front wall 16, the walls intersecting at corner 17, incandescent lamp 20 with filament 21 supported by posts 22, with base 23, and with glass enclosure 24. The cavity has a forwardly extending axis 14a.

The circular corner 17 of cavity 14 is a key feature in that it prevents light from filament 21 from directly reaching front surface 11. Rearward-going ray 30 is reflected by curved sidewall 13 into collimated ray 31. Upward-going (i.e., forward-going) ray 32 aims toward or is directed toward corner 17, but ideally must strike either front wall 16 or sidewall 15. If striking front wall 16, it is refracted to form a more vertical (forward-going) ray 33, which is refracted by convexity 12 to collimated ray 34. If striking sidewall 15, it is refracted to less vertical ray 35, which strikes the uppermost part of curved sidewall 13, which reflects it into collimated ray 36.

To the extent that it is ideally sharp, corner 17 prevents light from filament 21 from being lost out front face 11, which is the case with conventional reflectors. This is a key teaching of this invention: the internal cavity 14 in dielectric lens 10 has sharp corner 17 that prevents front losses typical of conventional reflectors.

Figure 2:
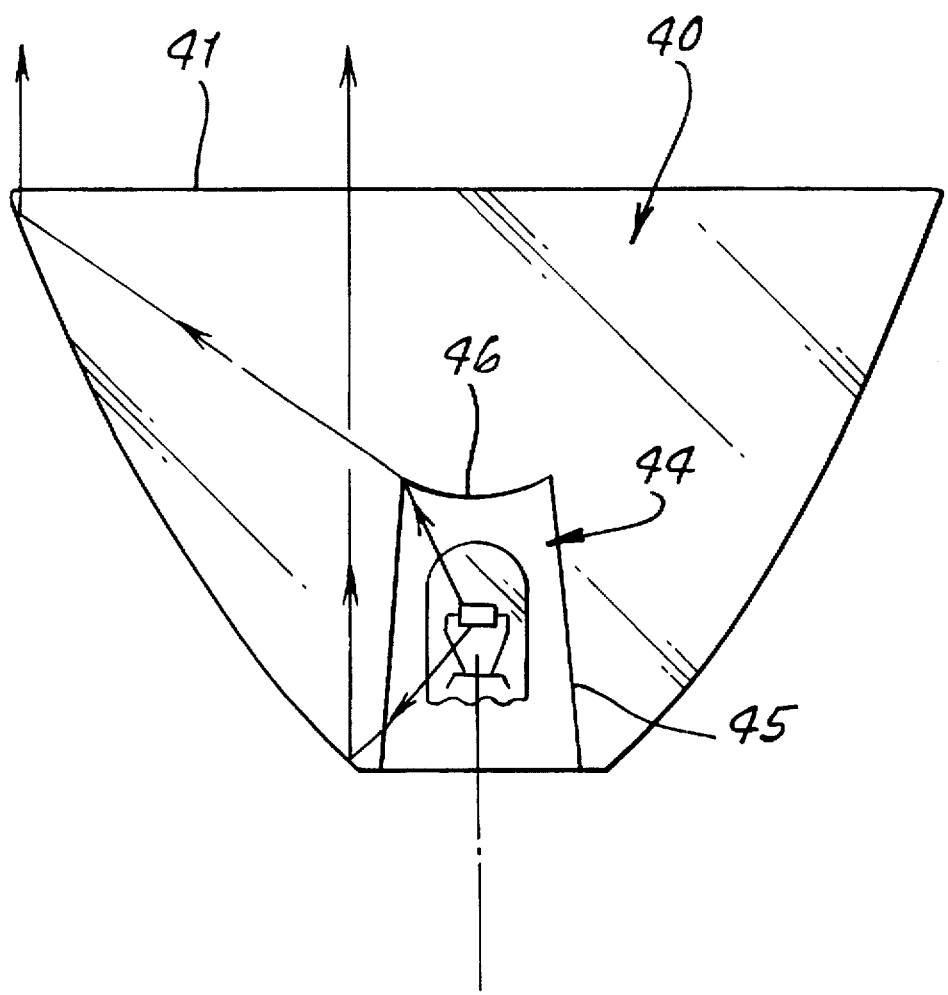

FIG. 2 shows lens body 40, which is similar in operation to body 10 of FIG. 2, but has totally planar front face 41 to facilitate production by molding. Internal cavity 44 has curved front face 46 that performs the same collimating function as convexity 12 in FIG. 1. Refracting sidewall 45 of cavity 44 is slightly conical to facilitate removal of lens body 40 from a mold. Front face 11 and sidewall 13 remain the same, but recessed convex lens 12 is omitted.

Figure 3:
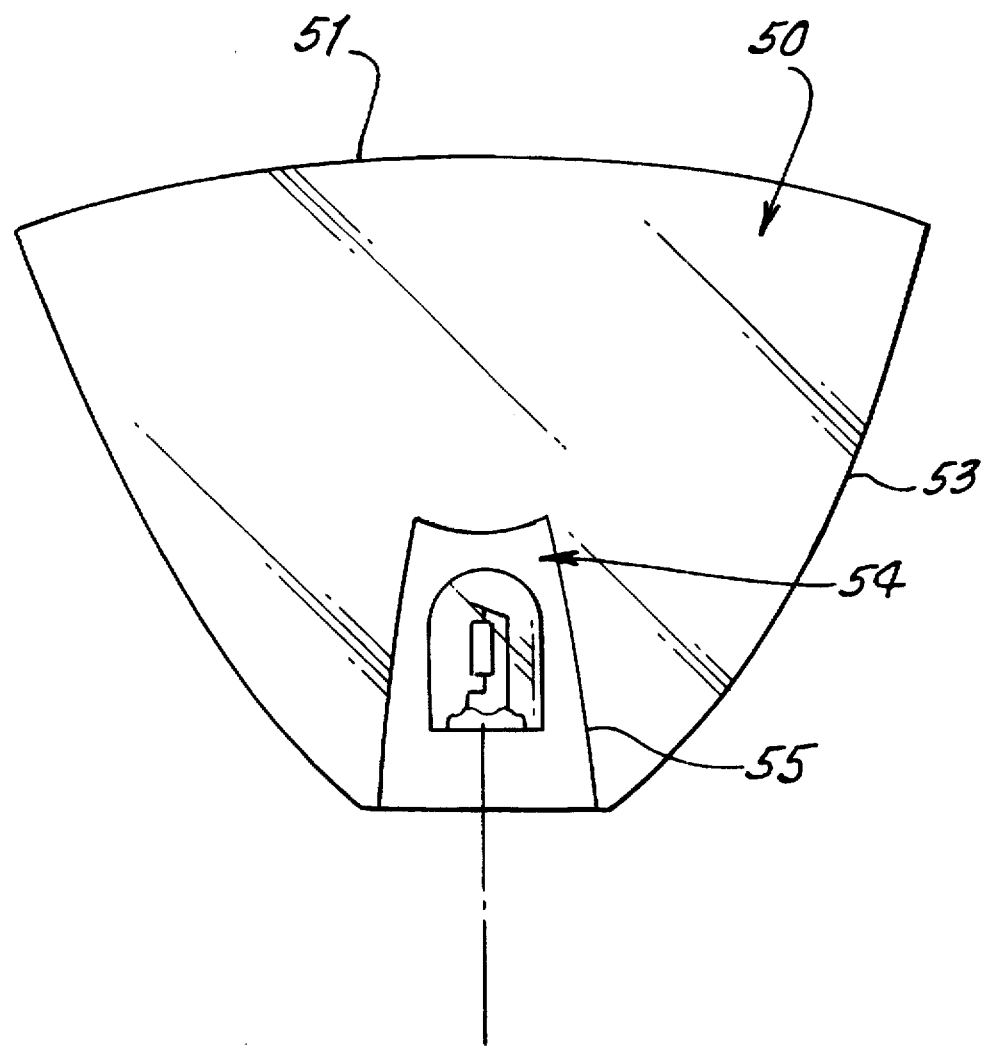

FIG. 3 shows lens body 50 modified further to facilitate molding for larger embodiments of this invention, such as an automobile headlight. Front surface 51 is slightly forwardly convex to prevent the slumping typical of a planar front. Lens sidewall 53 will accordingly be slightly different in shape from sidewall 13 of lens 10 in FIG. 1. In addition, cavity 54 has sidewall 55, with slight curvature to add another degree of freedom of optical design.

Accordingly, the basic lens device comprises:

a) a lens body having a front face facing forwardly, rearward body extent, and a curved sidewall extending between the rearward body extent and the front face, b) a rear cavity in the body, the cavity having a sidewall, and a front wall, defining a corner, c) and a light source in the cavity, and characterized in that light rays transmitted by the light source toward the curved sidewall, and toward the corner are collimated forwardly.

In FIG. 1, the front face has a portion that is offset toward the cavity and is in forward alignment with the cavity; and that front face offset portion is forwardly convex. Also, the cavity sidewall is cylindrical.

In FIG. 2, the cavity front wall is forwardly concave; and the cavity sidewall is forwardly tapered.

In FIG. 3, the lens body front face is forwardly convex. Also, the rear cavity sidewall has cup-shaped configuration and diverges rearwardly.

We claim:

1. In a device for directing light longitudinally forwardly, the combination comprising:
   a) a lens body having a front face facing forwardly, rearward body extent, and a curved sidewall extending between said rearward body extent and said front face,
   b) a rear cavity in said body, said cavity being free of solid material defined by the body, and having a sidewall and a front wall openly spaced from a glass enclosure, said sidewall and said front wall meeting at a sharp corner,
   c) and a light source enclosed in said enclosure arranged in said cavity, and characterized in that light rays transmitted by said light source toward said curved sidewall, and toward said sharp corner are collimated forwardly.

2. The combination of claim 1 wherein said front face has a portion that is offset toward said cavity and is in forward alignment with said cavity.

3. The combination of claim 2 wherein said front face offset portion is forwardly convex.

4. The combination of claim 2 wherein said front face offset portion has lateral dimension exceeding the lateral dimension of forwardmost extent of the cavity.

5. The combination of claim 1 wherein said cavity sidewall is cylindrical.

6. The combination of claim 1 wherein said cavity front wall is forwardly concave.

7. The combination of claim 6 wherein said cavity sidewall is forwardly tapered.

8. The combination of claim 1 wherein said light source is forwardly offset from rearwardmost extent of said body.

9. The combination of claim 1 wherein the lens body front face is substantially flat.

10. The combination of claim 1 wherein the lens body front face is forwardly convex.

11. The combination of claim 1 wherein the lens body sidewall has cup-shaped configuration and diverges forwardly.

12. The combination of claim 1 wherein the rear cavity sidewall has cup-shaped configuration and diverges rearwardly.

13. The combination of claim 1 wherein said body front face defines a recess in forward alignment with said cavity and spaced therefrom.

14. The combination of claim 1 wherein said sharp corner is circular.

* * * * *